United States Patent
Lagerman (10) Patent No.: US 8,478,192 B2
(45) Date of Patent: Jul. 2, 2013

(54) METHOD AND A DEVICE IN A MOBILE STATION FOR MAINTAINING A COMMUNICATION LINK TO A RADIO BASE STATION IN A CELLULAR TELEPHONY SYSTEM

(75) Inventor: Mikael Lagerman, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1227 days.

(21) Appl. No.: 12/301,694

(22) PCT Filed: Dec. 22, 2006

(86) PCT No.: PCT/SE2006/050620
§ 371 (c)(1),
(2), (4) Date: Nov. 20, 2008

(87) PCT Pub. No.: WO2007/136311
PCT Pub. Date: Nov. 29, 2007

(65) Prior Publication Data
US 2009/0186618 A1  Jul. 23, 2009

(30) Foreign Application Priority Data
May 22, 2006 (WO) ................ PCT/SE2006/000594

(51) Int. Cl.
*H04W 36/00* (2009.01)
*H04W 4/00* (2009.01)
*H04B 7/15* (2006.01)

(52) U.S. Cl.
USPC .......... 455/11.1; 455/436; 455/439; 455/442; 370/331

(58) Field of Classification Search
USPC .................. 455/436, 439, 442, 11.1; 370/331
See application file for complete search history.

(56) References Cited

U.S. PATENT DOCUMENTS 5,999,816 A * 12/1999 Tiedemann et al. .......... 455/437
7,299,019 B1 * 11/2007 Austin et al. ............... 455/161.3

(Continued)

FOREIGN PATENT DOCUMENTS

| EP | 1 051 053 A | 11/2000 |
|---|---|---|
| GB | 2294181 A | 4/1996 |
| WO | WO 98/30056 A2 | 7/1998 |

OTHER PUBLICATIONS

U. Meyer, S. Wetzel "On the impact of GSM encryption and man-in-the-middle attacks on the security of interoperating GSM/UMTS networks", Personal, Indoor and Mobile Radio Communications (PIMRC), Publication Dated Sep. 5-8, 2004, vol. 4.

*Primary Examiner* — Bobbak Safaipour (57) ABSTRACT

The invention concerns a temporary radio base station, temporary RBS (140), which can gain and maintain control of the traffic to and from a targeted radio base station (120) in a wireless cellular telecommunications system (100), and a dedicated user terminal (530) for use the system. The dedicated user terminal (530) comprises an identification device being arranged to identify the temporary RBS (140) by use of unique information being at least embedded in a transmitted signal from the temporary RBS (140). The dedicated user terminal (530) is arranged to disregard the temporary RBS (140) when detected, and to choose the targeted RBS (120), or an RBS arranged to operate in a neighboring cell, in the same manner as if the temporary RBS (140) would not exist. The invention also relates to a method for the devices and a system comprising the devices.

21 Claims, 6 Drawing Sheets

U.S. PATENT DOCUMENTS

| | | | |
|---|---|---|---|
| 7,409,214 B2* | 8/2008 | Lee | 455/436 |
| 7,636,571 B2* | 12/2009 | Lee et al. | 455/437 |
| 7,796,568 B2* | 9/2010 | Tynderfeldt et al. | 370/337 |
| 2002/0041584 A1* | 4/2002 | Sashihara | 370/337 |
| 2002/0173275 A1* | 11/2002 | Coutant | 455/67.1 |
| 2004/0095915 A1* | 5/2004 | Saffre et al. | 370/338 |
| 2005/0143062 A1* | 6/2005 | Dowling | 455/423 |
| 2006/0172738 A1* | 8/2006 | Kwon et al. | 455/439 |
| 2007/0293222 A1* | 12/2007 | Vikberg et al. | 455/436 |
| 2011/0164603 A1* | 7/2011 | Lagerman | 370/342 |

* cited by examiner

METHOD AND A DEVICE IN A MOBILE STATION FOR MAINTAINING A COMMUNICATION LINK TO A RADIO BASE STATION IN A CELLULAR TELEPHONY SYSTEM

TECHNICAL FIELD

The present invention relates to a method and a device for letting a temporary radio base station gain and maintain control of traffic to and from a targeted radio base station in a wireless cellular telecommunications system. In the system in question, there are a number of radio base stations for controlling and routing traffic to and from user terminals in the system, and each radio base station routes and controls the traffic to and from a certain cell within the system. The invention also relates to a dedicated user terminal in the system and a method for the dedicated user terminal and a system comprising both the devices.

BACKGROUND

Many situations can be envisioned in which it is desirable for government bodies such as law enforcement agencies to prevent the use of cellular telephones within a certain geographical area. For example, during a situation of civil unrest such as riots, it may be desirable for the police or other similar government bodies to prevent the function of cellular telephones within a certain section of a city.

Other cases where it may also be desirable to prevent the function of cellular networks in a defined geographical area might be, for example, before a police raid on a building. Another example of a problem area which could be addressed by area-selective prevention of cellular telephony is cellular telephones which have been smuggled into prisons, which is beginning to constitute a major problem.

Traditionally, the prevention of cellular telephony within an area has been approached much in the same manner as traditional electronic warfare. This means that traditional solutions have been used which are mainly aimed at transmitting a jamming signal, usually noise, on the relevant frequencies, so as to "drown" the information in noise, and to thus create a signal-to-noise ratio which prevents the user terminals in the targeted area from detecting the "payload" signal.

A problem with the technique described above, i.e. so called "brute force" jamming, is that this is a method which consumes a great deal of energy, thus making the equipment heavy and not very portable. In addition, since noise signals are transmitted with a relatively high output power at well known frequencies, it can be quite easy for a skilled user to detect that the system is being tampered with.

Document FR 2 858 742 describes a procedure and a device for tampering with cellular communications which addresses some of the problems described above. However, the device uses a great deal of processor power since it relies on a complex algorithm and tries to identify certain signals on a more or less constant basis.

Furthermore, since there are temporary radio base stations that may control the communication system to prevent the use of mobile stations such as cellular telephones within a certain geographical area, there is a need for a mobile station that can be used in spite of the appearance of such a temporary base station. This is a concern for said bodies since it is desirable for said bodies to have the possibility to allow communication for designated mobile stations within the controlled area at the same as non-designated mobile stations cannot operate in the controlled area.

The document FR 2858742 describes a mobile station that may be used in a controlled area, but a problem with this mobile station is that the user terminal has to order the temporary radio base station to stop interfering with a certain dedicated channel and to allow communication on the dedicated channel. This step is not a desirable solution since the existing system has to be amended in order to allow communication to and from the mobile station. Another disadvantage is that a non-designated mobile station may easily be modified so that it can order the temporary base station to allow communication on a dedicated channel.

There is thus a need for a more simple temporary base station and a more simple mobile station that can be used in an existing communication system, and a method for using said devices.

SUMMARY

The object of the present invention is thus to meet the above stated need and to remedy the above stated deficiencies. The invention concerns a method and a device by means of which control can be gained of the cellular traffic in a certain area, without creating a large need for processor capacity and transmitter power. In addition, control of the traffic must not only be gained, but also maintained. The traffic which it is desired to gain and maintain control of is that between the user terminals in a certain area and a radio base station, RBS, or radio base stations which their traffic is controlled by and routed via. Furthermore the invention concerns a user terminal that can continue to use the radio base station in the certain area in spite of the device having gained controlled over the area.

This need is thus met by the present invention in that it provides a device and a method for letting a temporary radio base station, temporary RBS, gain and maintain control of the traffic to and from a targeted radio base station in a wireless cellular telecommunications system, where the system comprises a number of radio base station for routing traffic to and from user terminals in the system.

Each radio base station in such a system controls the traffic to and from a certain cell within the system, and at least a number of the radio base stations in the system each transmits an identity signal and a list of candidate frequencies for use by user terminals when switching to another radio base station.

The phrase "switching to another base station" refers to the fact that the user terminals in a cellular system will have their traffic controlled by and routed via a radio base station which fulfils certain criteria, among them signal strength. When the signal strength from the current radio base station falls below a certain pre-defined level for a certain pre-defined amount of time, a transfer of the traffic is made to another radio base station from which a clearer signal is received by the user terminal.

According to the invention, control of the traffic to and from the targeted radio base station is gained by positioning the temporary radio base station in or adjacent to the cell of the targeted radio base station, and programming the temporary radio base station to transmit on one of the frequencies in the candidate list broadcast by the targeted radio base station.

Suitably but not necessarily, the frequency on which the temporary RBS is programmed to transmit on is a frequency used by an RBS which is not immediately adjacent to the cell of the targeted RBS.

Thus, the temporary radio base station is made to transmit on a frequency which is monitored by the user terminals in the area in question, and with a power level which ensures transfer of the user terminal (-s) to the temporary radio base station from the targeted radio base station. In addition, the temporary radio base station is made to transmit as its identity signal a signal which is the same as the identity signal of the radio base station on whose frequency the temporary radio base station transmits on. Hence, control of the traffic of the targeted radio base station will be acquired by the temporary radio base station.

In order to let the temporary radio base station not only gain but also maintain control of the traffic of the targeted radio base station, the temporary radio base station is programmed to transmit a list of candidate frequencies, but with the list being such that the user terminals cannot find signals with sufficient strength on any of the candidate frequencies in the vicinity of the take-over area. Accordingly, control of traffic which has been transferred to the temporary radio base station will also be maintained by it.

In a preferred embodiment of the invention, the list of candidate frequencies is made empty, which will mean that the candidate frequencies cannot be found by the radio base stations of which control has been gained, since the user terminals will in fact not look for candidate frequencies or false frequencies.

The method of the invention can be applied to a number of cellular telephony systems, among which can be mentioned TDMA systems such as the GSM system, or to CDMA systems.

If the invention is applied to a GSM system, the identity signal which will be used is the so called CGI-signal (CGI: Cell Global Identity), or the BSIC signal (BSIC: Base Station Identity Code), and the list of candidate frequencies will be the so called BA list. (BA: BCCH Allocation, where BCCH stands for Broadcast Control Channel.)

Also, as opposed to prior art, no advanced algorithms or large amounts of processor power are needed in order to obtain the goals of the invention. In addition, the temporary base station of the invention can achieve the desired objectives in a much more energy efficient manner, which makes it possible to design a smaller and more compact device than previously, which can, conceivably be battery powered. Also, as opposed to traditional jammers, which have used the "brute force" approach, the device of the invention does not cause as much interfering noise in the system.

The need is also met by a dedicated user terminal for use in the above mentioned wireless cellular telecommunications system comprising the targeted RBS and the temporary RBS. As has been described above the temporary RBS gains and maintains control of the traffic to and from the targeted radio base station by transmitting a signal to the user terminals in the cell so that the system chooses the temporary RBS. When the user terminal is idle, i.e. is switched on but not in active mode, the user terminal chooses the temporary RBS since it has the strongest signal. However, when the user terminal is in active mode, i.e. communicates with a second user terminal, a Base Station Controller, BSC, controls the communication to and from a number of RBSs. The BSC uses a number of parameters when assessing the RBSs, for example time-out to avoid hysteresis and signal strength. Since the temporary RBS transmits on one of the frequencies in the candidate list broadcast by the targeted radio base station, but with a higher power level than the targeted RBS, the BSC considers the temporary cell to be the most preferred cell and therefore directs the user terminal to the corresponding channel, used by the temporary cell, according to standard procedures in the network.

The transmitted signal comprises unique information that can be used by the dedicated user terminal. The inventive dedicated user terminal comprises an identification device being programmable so that it can identify the unique information in the transmitted signal and thereby identify the temporary RBS. The unique information may be embedded in the transmitted signal from the temporary RBS or may constitute the entire signal from the temporary RBS.

The identification device may be pre-programmed with the same unique information as in the transmitted signal so that, upon transmission of the signal, the identification device may receive and compare the information and identify the temporary RBS, should the information match. The identification device may for example be comprised in a SIM-card. The unique information may then easily be changed in the dedicated user terminal by simply changing the SIM-card.

When the dedicated user terminal has identified the temporary RBS, the dedicated user terminal can disregard the temporary RBS and choose the targeted RBS, or an RBS arranged to operate in a neighbouring cell, in the same manner as if the temporary RBS would not exist. This has the advantage that the targeted RBS and the dedicated user terminal may continue to communicate when the temporary RBS gains and maintains control of the traffic to and from the targeted radio base station, but that the user terminals that lacks the identifying means is directed to communication with the temporary RBS. The temporary RBS may then hinder the non-dedicated user terminals from communication within the area being controlled by the temporary RBS by giving the user terminals candidate frequency lists that are either empty or pointing to RBSs that are too distant.

Furthermore, the unique information is information that would appear normal for a non-dedicated user terminal in the cell, but which in fact comprises information that can be extracted and identified by the identification device in the dedicated user terminal to be the unique information. The unique information may be comprised the above mentioned: Cell Global Identity, CGI, signal; or in the Basic Station Identity Code, BSIC, signal; or in a list of candidate frequencies being a BA-list. The BA-list may be empty or may comprise a false frequency candidate, or the BA-list may comprise one or more true candidate frequencies not suitable for use in the cell.

Further details and advantages of the invention will be disclosed below.

BRIEF DESCRIPTION OF THE DRAWINGS

The invention will be described in more detail in the following, with reference to the appended drawings, in which:

FIG. 5 shows a system in which the invention is applied, and in which;

DETAILED DESCRIPTION

In the following, the invention will be described in closer detail, and use will be made of some examples of a cellular system in order to illustrate the inventive concept. The examples will mainly show the invention applied to a generic GSM system, in other words a system which is based on the TDMA principle, Time Division Multiple Access. However, it should be pointed out, and will be realized by those skilled in the art, that the invention can equally well be applied to cellular systems which are based on other principles, such as, for example, CDMA, Code Division Multiple Access.

Figure 1:
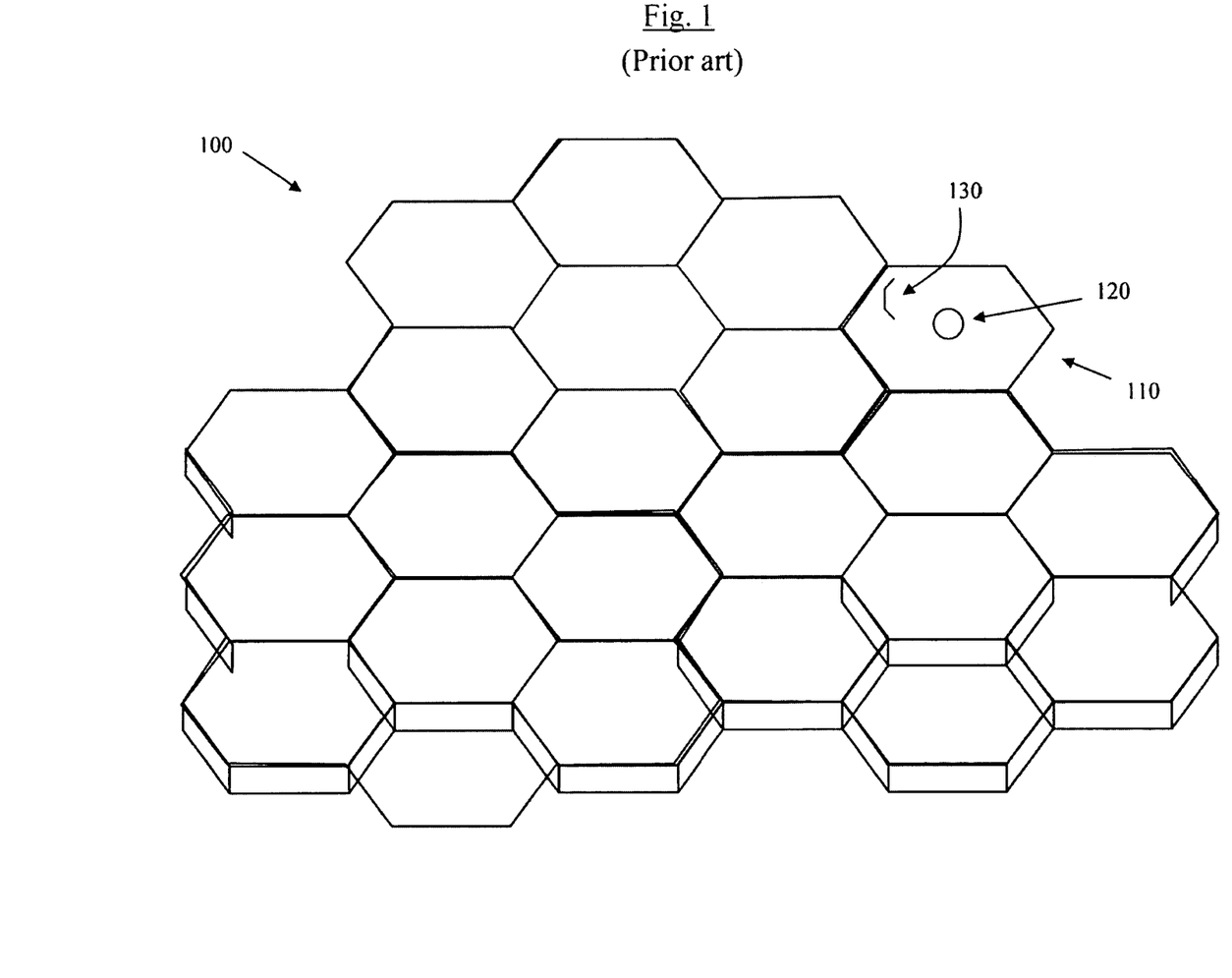
FIG. 1 shows a part of a cellular system according to prior art in which the invention may be applied.

Before the inventive concept is described, a brief description needs to be made of some functions in a cellular telephony system:

FIG. 1 shows the general layout of a wireless cellular system 100, or at least a part of such a system. As indicated in FIG. 1, the system comprises a plurality of separate and neighbouring geographical areas, so called "cells", exemplified by the cell denoted as 110. Within each cell there is usually one radio base station ("RBS") 120 which controls all traffic to and from user terminals 130 in the cell, and via which all traffic to and from the user terminals 130 in the cell 120 is routed. The user terminals in the system continuously monitor the quality of the received signal from the RBS which routes and controls their traffic, in order to determine when their traffic should instead be controlled by and routed via another RBS, in other words if a so called "hand-over" to another RBS should be performed.

The signal quality, as well as certain other predefined parameters, is used when deciding if a hand-over should be made. The decision of making a hand-over can be made either by the user terminal 130 or by a so called Base Station Controller (BSC) at system level. Usually, the decision is made by a control function or control means in the user terminal if the user terminal is not engaged in an active session, i.e. when the terminal is in the so called "idle mode", and by the BSC if the user terminal is in the so called "active mode", i.e. there is a voice or data session in progress. In the latter case, i.e. during active mode, the user terminal reports the relevant data to the BSC, which will then decide if and when a hand-over should be made.

Each cell in the system 100 has a globally unique identity within the system, in some systems such as GSM referred to as the CGI, the Cell Global Identity, which usually consists of 15 to 18 bytes. Since the CGI comprises such a rather large number of bits, a shorter identity is often used by the radio base station in the cell, the shorter identity being referred to as the BSIC, Base Station Identity Code.

The BSIC or the CGI are broadcast at frequent intervals by the radio base station 120 in the cell 110, so that the cell and its radio base station may be identified by the user terminals 130. The BSIC and/or the CGI are broadcast by the radio base stations on a special channel, usually a special logical channel. Also included in this broadcast is the so called BA list, which is a list of frequencies used by radio base stations in the neighbourhood of the broadcasting radio base station.

With reference to FIG. 1 and the cell 110, the BA list is thus used by the user terminals 130 in the cell 110 in order to know which other frequencies should be monitored for signal quality and possibly used in hand-over.

In the case of the "passive mode", a hand-over will roughly take place as follows: a user terminal 130 in the cell 110 will listen to the broadcast message from the radio base station in the cell 110, and will monitor the frequencies in the BA list to see if they provide a better signal quality than the radio base station in the cell 110. If the answer is affirmative, and certain other criteria are fulfilled, such as for example the duration of the signal quality, the user terminal 130 switches its traffic to the radio base station with the better quality, and then starts to monitor the BA list of that radio base station.

Figure 2:
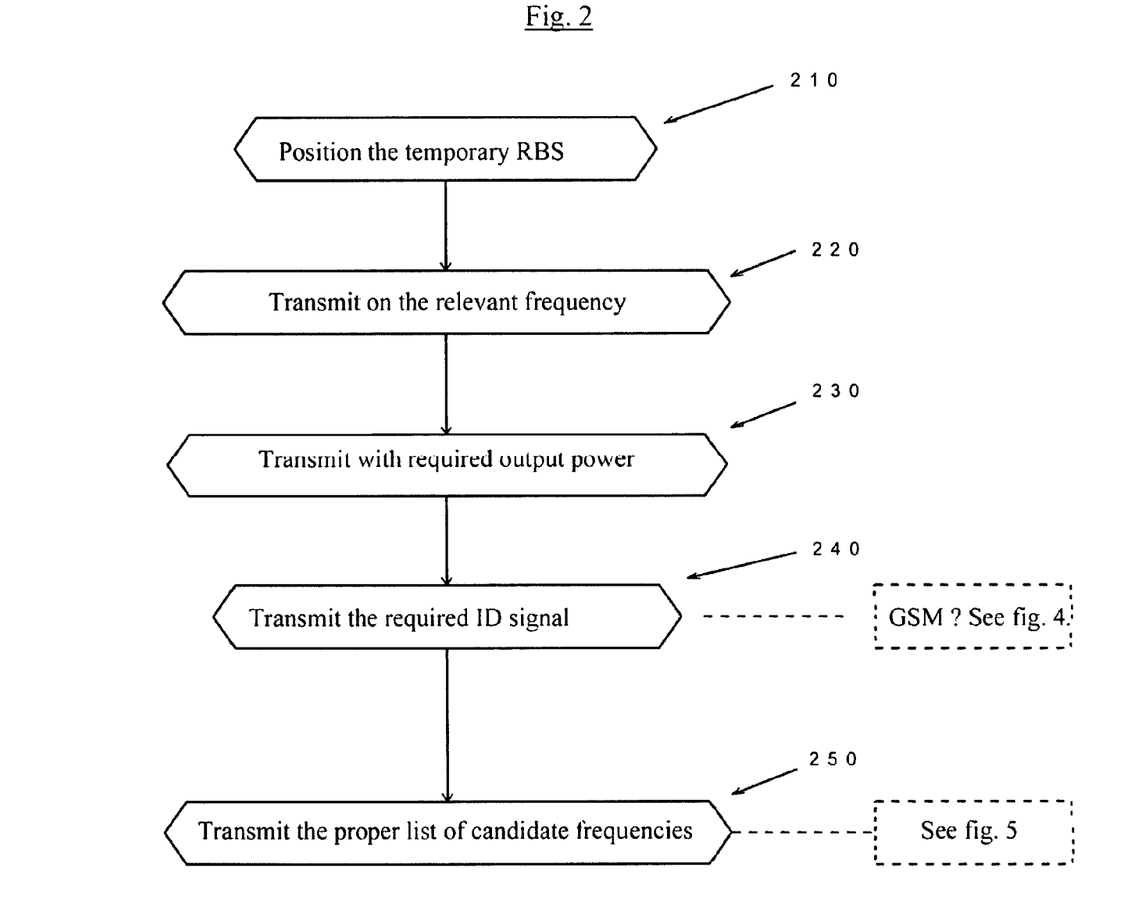
FIG. 2 shows a flowchart outlining some major steps of a method for a temporary RBS according to the invention.

With reference to FIG. 1 and also to the flowchart in FIG. 2, an example of a method according to the invention will be shown. Imagine an area in which it is desired that no cellular telephony should be able to take place, for example a known hideout for criminals, which the police have decided to raid. It would be highly valuable to the police if no cellular calls could be made to or from the vicinity of the building prior to and during the raid. Control of all cellular telephony in the area in question is carried out by a regular RBS in the system, which RBS will thus be "targeted" for takeover of its traffic.

In short, which will be elaborated upon later in this text, a method according to the invention utilizes an extra RBS, from now on referred to as a temporary RBS, in order to gain control of the traffic of the targeted RBS.

In order to utilize the invention optimally, it is necessary to determine which frequencies that are in the candidate list, i.e. in a GSM system the BA list, of the targeted radio base station. This information can be obtained in a variety of ways, for example from the operator or operators of the cellular systems in that area, or by measurements carried out in the area in which it is desired to gain and maintain control of the traffic.

In addition to this, it is necessary to obtain the identity code of the station whose frequency the temporary radio base station will transmit on. This information can also be obtained either by measurements in the field, or from the operator of the system.

It is also suitable to find out what the signal level is for the user terminals in the area in question, since it is desired for the temporary RBS to transmit with an output power level that makes the user terminals in the area to want to switch their traffic to the temporary RBS, but as an alternative this can be done by simply transmitting with an output level which it is a priori known that the targeted RBS cannot match.

When the information which was described above has been obtained, it is used in the temporary RBS in the following way:

The temporary RBS is positioned in the cell of the targeted RBS, or adjacent to said cell, see block 210 of FIG. 2.

The temporary RBS is made to transmit on one of the frequencies in the candidate list of the targeted RBS, said frequency being used by an RBS which is suitably not immediately adjacent to the cell of the targeted RBS, see block 220 of FIG. 2.

The transmissions on said control frequency are made with such an output power level that user terminals within a certain area will perceive the signal from the temporary RBS as a signal of better quality than the targeted RBS, and will accordingly want to switch their traffic to the temporary RBS, see block 230 of FIG. 2.

The temporary RBS transmits on its control channel an identity which is the same as that of the RBS whose control frequency is used, see block 240 of FIG. 2.

Thus, by means of the steps outlined above, user terminals within a certain area will perceive a signal which is stronger than that of the targeted RBS, and since the received signal is one of those on the candidate list of the targeted RBS, they will perceive it as a regular "competing" signal, and will switch their traffic to the temporary RBS. When and if the BSC is notified of the measured signal strength by the user terminals, it will order them to switch their traffic to the temporary RBS for the same reason, i.e. that the temporary RBS will be perceived as an ordinary candidate for "hand-over".

Figure 3:
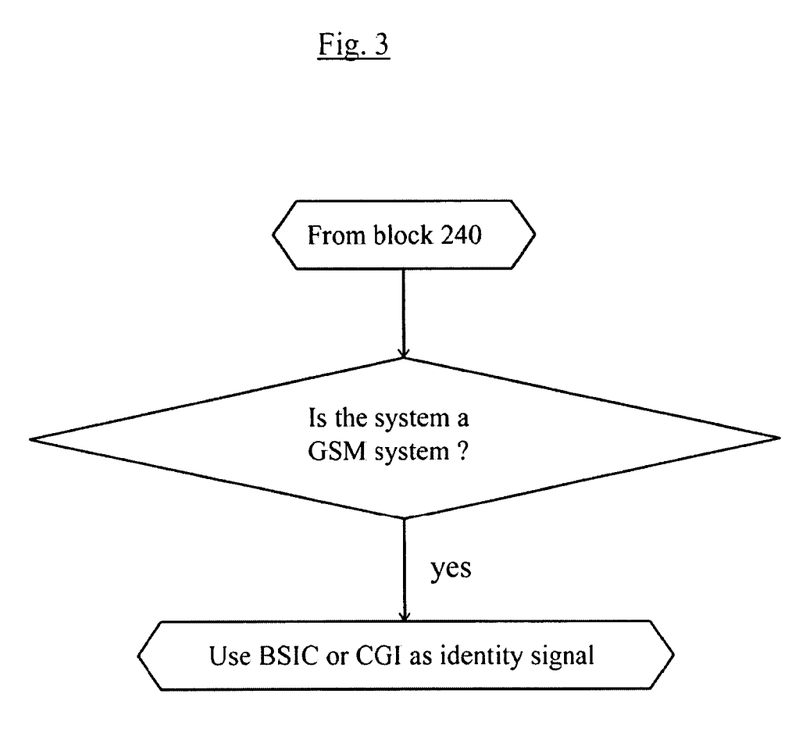
FIGS. 3 and 4 show alternative steps for the flowchart of FIG. 2.

These steps can be applied either to a GSM system, i.e. to a TDMA system, or to a CDMA system. As an example, if applied to a GSM system, the identity signal which is transmitted can be the so called CGI (Cell Global Identity) or the BSIC signals. This is outlined in FIG. 3.

Thus, control has been gained of some or all of the traffic of the targeted RBS, depending on the output power which is used for the transmissions by the temporary RBS. The next issue is to ensure that control is also maintained by the temporary RBS, which can be done in the following way: the user terminals whose traffic has been transferred to the temporary RBS will, as explained previously, listen to frequencies comprised in the candidate list of their current RBS, i.e. in this case the temporary RBS.

In order to maintain control of these user terminals the temporary RBS is, according to the invention, programmed to transmit a list of candidate frequencies, with the list being such that user terminals whose traffic has been transferred to the temporary RBS cannot find signals on any of the candidate frequencies in the vicinity of the cell of the targeted RBS, at least not with such a signal strength that they will appear as "attractive" candidates for a hand-over. Thus, there will be no "competing" frequencies to listen to, or at least to switch over to.

Figure 4:
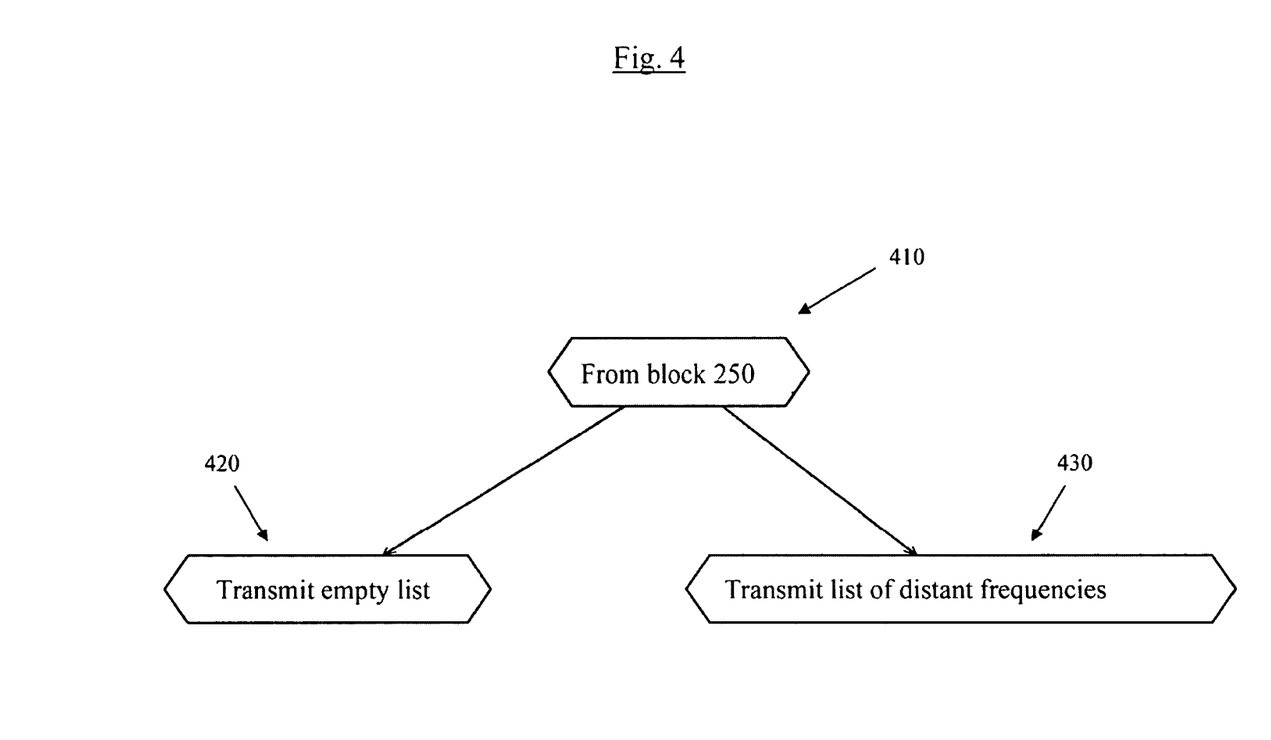

One way of achieving such a candidate list is to make the candidate list empty, or, as an alternative, the candidate list can comprise frequencies of RBSs which are known to be so distant that they cannot compete with the temporary RBS. These two alternatives are shown in FIG. 4.

This step of the invention can also be applied equally well to TDMA systems or CDMA systems. If applied to a GSM system, the candidate list will usually be the so called BA list.

Thus, by means of the invention, control of traffic to and from a targeted RBS has been gained by the temporary RBS and will be maintained by it, which was the object of the invention.

Figure 5:
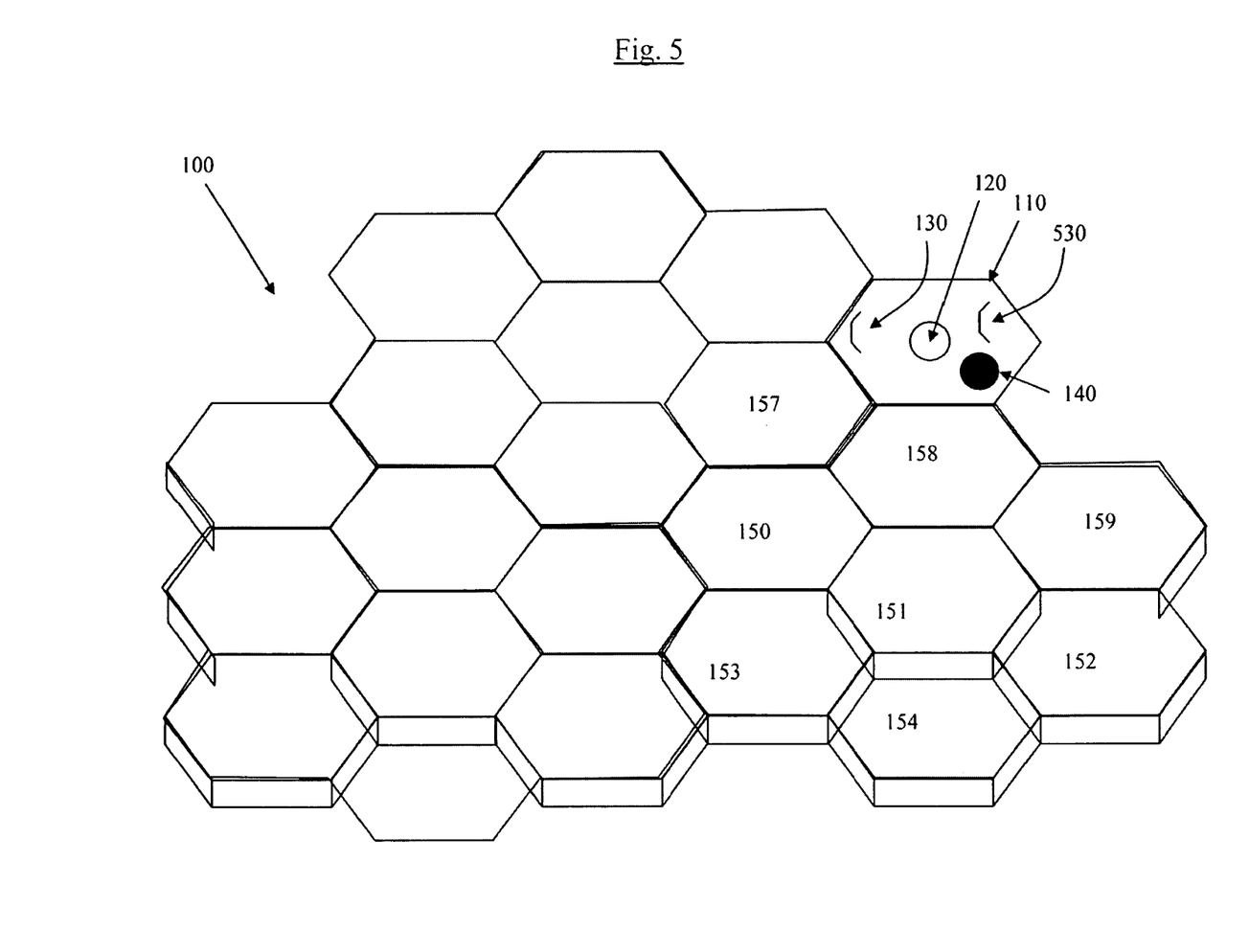

Returning now to the positioning of the temporary RBS and to its programming regarding the frequency it will transmit on to gain control of traffic from the targeted RBS, and also to its candidate list, reference is made to FIG. 5.

In FIG. 5, the wireless cellular telecommunications system of FIG. 1 is shown again, with the targeted RBS denoted as 120, and the cell it controls being denoted as 110. The temporary RBS of the invention has been given the reference number 140.

As mentioned previously, the frequency which the temporary RBS 140 is made to transmit on is chosen from the candidate list of the targeted RBS 120. However, the frequency should not be chosen from one of those used by neighbouring cells or base stations, for examples the base station of the cell denoted as 157-159 in FIG. 5, since those base stations might provide the user terminals of the targeted RBS 120 with a strong signal.

Instead, the temporary RBS 140 should be programmed to transmit on a frequency which is in the candidate list of the targeted RBS 120, but which belongs to an RBS which is as remote as possible from the targeted RBS 120 while still being in the candidate list of the targeted RBS 120. The word "remote" in this context can be taken to mean either geographically or as an indicator of the strength of the signal from that RBS in the cell 110. One example of a suitable such radio base stations is the one denoted by 151 in FIG. 5. However, if made necessary, by for example, frequency planning and reuse, the temporary base station might have to "borrow" frequency and identity from a neighbouring RBS 157-159.

In FIG. 5 is also shown a dedicated user terminal 530, according to the invention, positioned in the cell 110.

Figure 6:
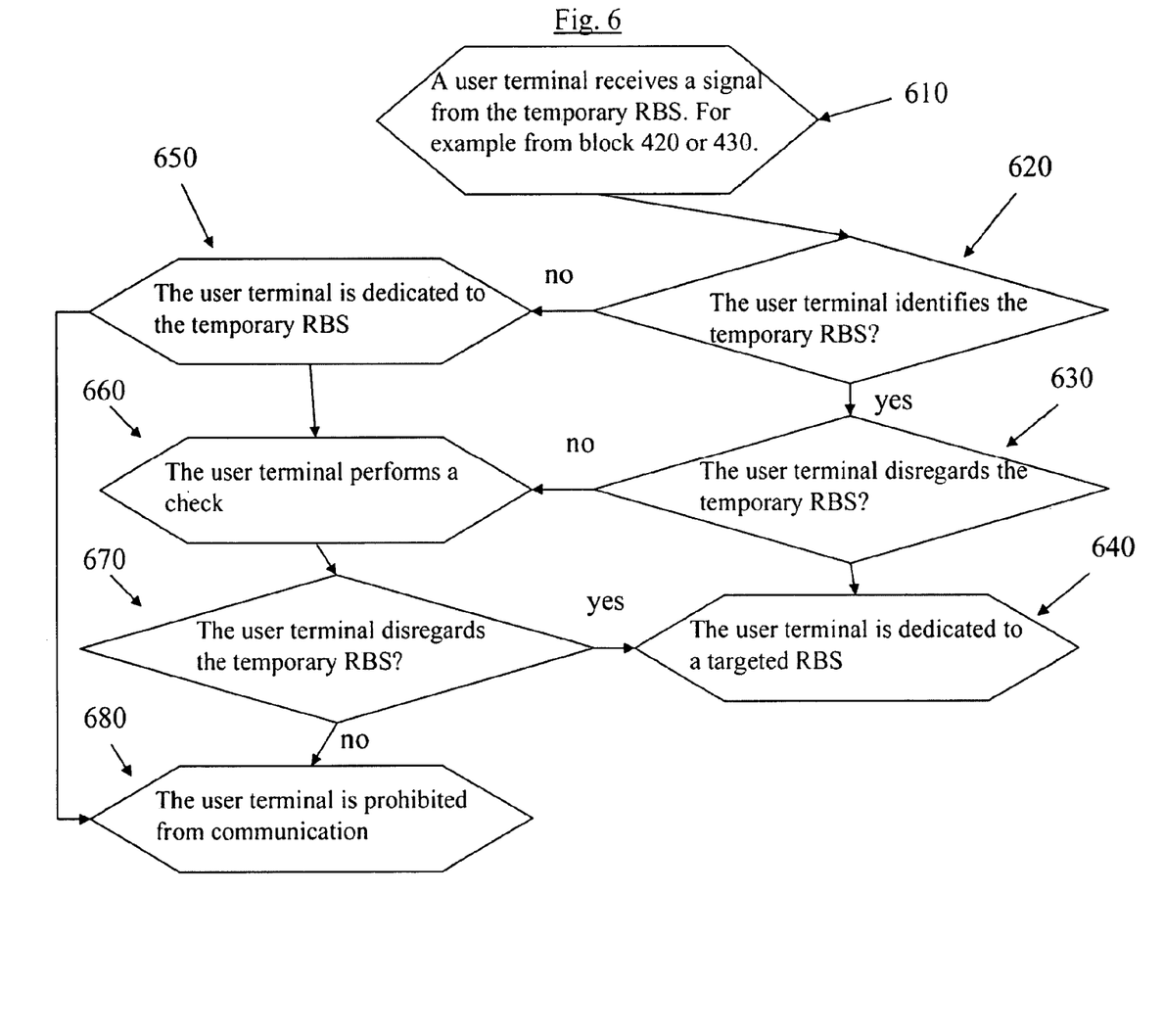
FIG. 6 shows a flowchart outlining some major steps of a method for a user terminal according to the invention.

FIG. 6 shows a flowchart outlining some major steps of a method for the dedicated user terminal in FIG. 5. The function of the dedicated user terminal will be explained below with reference to FIGS. 1-5 and the reference numbers in these figures will be used accordingly.

In FIG. 5 the dedicated user terminal 530 is used in the wireless cellular telecommunications system 100 comprising the targeted RBS 120 which is normally arranged to control the traffic to and from the first cell 110 and for routing traffic to and from the user terminals 130, 530 in the cell 110. Furthermore in FIG. 6 the temporary RBS has gained and maintained control of the traffic to and from the targeted radio base station 120.

The dedicated user terminal 530 comprises an identification device (not shown) being programmable with information being unique for the temporary RBS 140. The identification device is arranged to be used when the temporary RBS 140 has gained and maintained control of the traffic to and from the targeted RBS 120. The identification device is arranged to identify the temporary RBS 140 by use of the unique information being at least embedded in a transmitted signal from the temporary RBS, see blocks 620 and 630 in FIG. 6. The unique information is stored in the identification device and is compared to the unique information in the transmitted signal so that the identifying means can determine whether a match exists or not. When the identification device has identified the temporary RBS 140, i.e. when there is a match in the unique information, the dedicated user terminal 530 is arranged to disregard the temporary RBS 140, see block 620, and to continue using the targeted RBS 120, or an RBS arranged to operate in a neighbouring cell 157, 158 in the same manner as if the temporary RBS would not exist, see block 640. However, the dedicated user terminal 530 may not disregard the temporary RBS 140 because it is programmed to perform a check of the temporary RBS 140 before disregarding it, see block 630 and 660 and the discussion below.

In FIG. 6, the dedicated user terminal 530 receives the transmitted signal from the temporary RBS, see block 610. The signal comprises unique information from the temporary RBS in the form of an empty list of candidate frequencies according to block 250. The list of candidate frequencies may be empty as in block 420 or may comprise a list of frequencies for distant RBSs according to block 430.

The invention is not limited to these two examples but the unique information may be any information that could be extracted from the signal and identified by the dedicated user terminal 530. The unique information is advantageously information that appears to be normal for the user terminal in the cell so that an unknowing user terminal chooses the temporary RBS instead of rejecting it. However, the signal must comprise information that can be extracted and identified by the identification device, comprised in the dedicated user terminal, to be the unique information. The unique information may be comprised the above mentioned: Cell Global Identity, CGI, signal; or in the Basic Station Identity Code, BSIC, signal; or in a list of candidate frequencies being a BA-list. The BA-list may be empty or may comprise a false frequency candidate, or the BA-list may comprise one or more true candidate frequencies not suitable for use in the cell.

The unique information may also comprise information on a base station network that cannot be used by the user terminals in the cell. Such a network may, for example, be a small area network for indoor use or another legal small area network that is out of reach for the user terminals in the cell.

The unique information may also comprise information on a false base station network, i.e. a frequency that does not exist.

Different dedicated user terminals may be programmed differently so that the unique information represents different scenarios for the different dedicated user terminals. For example, in one scenario, the unique information is identified and interpreted by the identification device in one dedicated user terminal 530 so as to mean that the dedicated user terminal 530 may be allowed to continue to communicate with the targeted RBS 120. In another scenario, the identification device is programmed to interpret the unique information in such a way that the dedicated user terminal 530 shall perform a pre-programmed task in order to be allowed to communicate with the targeted RBS 120. In a third scenario, the identification device is programmed to interpret the unique information in such a way that the dedicated user terminal 530 shall be directed to the temporary RBS 140 and thus be hindered from communication.

The possibility of programming the dedicated user terminals differently gives the operator of the temporary RBS 140 the possibility to control the communication in the area controlled by the temporary BS. This is useful, for example, when a law enforcement force is going to perform a tactical operation in a dedicated area, where regular user terminals 130 in the area as well as a selected first group of dedicated user terminals 530 are prevented from communication by the temporary RBS 140, while members of a second group of dedicated user terminals 530 are allowed to communicate.

The programming of the identification device, i.e. of the dedicated user terminal 530, is made before the tactical operation, for example during briefing. The dedicated user terminals 530 may be programmed by use of any suitable means. A super user terminal (not shown) may be used for transmission of the unique information to the dedicated user terminals 530. When the dedicated user terminals have received the unique information the identification device stores the unique information so that it can be compared to information that is going to be transmitted from the temporary RBS 140. The super user terminal may transfer the unique information to the dedicated user terminals 530 by means of, for example: Short Message Service, SMS; or infrared transmission; or an electromagnetic transmission; or by wire, i.e. the dedicated user terminal may be docked to the super user terminal; or any other suitable means for communication. The unique information may also be supplied to the dedicated user terminal via a portable memory device that can be connected to the user terminal. Yet another way would be disclosure in oral or written form, where the user would manually type the unique information into the user terminal via the regular keypad.

The identification device may be any suitable device in a user terminal 530. For example, the identification device may be a SIM-card, or another printed circuit board, or any other programmable units comprised in the user terminal or connectable to the user terminal. If an external identification device is used, the unique information may be transferred to that external unit by any of the above discussed methods.

In block 650 in FIG. 6, the dedicated user terminal 530 identifies the temporary RBS 140 according to the above, but the non-dedicated user terminal 130 cannot identify the temporary RBS and is therefore dedicated to the temporary RBS. The non-dedicated user terminal 130 is controlled by the temporary RBS on a certain frequency according to an established standard set for any user terminal and any RBS 120 in the communication system. The candidate list sent out by the temporary RBS 140 to the user terminal 130 comprises either candidate frequencies that the user terminal cannot use, or comprises no candidate frequencies at all. The user terminal 130 is in both cases locked to the temporary RBS without any possibility to communicate.

However, if the user terminal in block 650 is a dedicated user terminal 530 with restrictions, the dedicated user terminal performs a check according to block 660. However, another dedicated user terminal 530 with different restrictions may have identified the temporary RBS 140 in block 620, but has not disregarded the temporary RBS in block 620 because it is programmed to perform a check first, see block 660. The check in block 660 can for example be made by the dedicated user terminal 130 calling a specific telephone number. If there is an answer, the temporary RBS 140 is the temporary RBS that the dedicated user terminal 530 is supposed to match. According to another example, the dedicated user terminal 530 may send an SMS, or the like, in order to verify the temporary RBS 140.

If the dedicated user terminal identifies and then allows the temporary RBS in block 660, the dedicated user terminal 530 disregards the temporary RBS, see block 670, and is dedicated to the targeted RBS 120, see block 640.

The non-dedicated user terminals 130 and the dedicated user terminals 530 that has not made a positive identification in block 670 is dedicated to the temporary RBS and is then hindered from communication according to block 680 and is thus prohibited from communication.

The invention is not limited to the examples of embodiments shown in the drawings and described above, but may freely be varied within the scope of the appended claims. For example, the dedicated user terminal may automatically perform the roaming from the temporary RBS to the targeted RBS or the dedicated user terminal may be arranged to perform such an action manually.

The invention claimed is:

1. A method of letting a temporary radio base station (RBS), gain and maintain control of traffic to and from a targeted radio base station in a wireless cellular telecommunications system, said system comprising a plurality of RBSs for routing traffic to and from user terminals in the system, each RBS controlling the traffic to and from a certain cell within the system, a number of said plurality of RBSs in the system each transmitting an identity signal and a list of candidate frequencies for use by user terminals when switching RBS, the method comprising the following steps:

positioning said temporary RBS in or adjacent to the cell of the targeted RBS,
  the temporary RBS transmitting on one of the frequencies in the candidate list broadcast by the targeted RBS,
  setting the transmissions of the temporary RBS to such a power level that traffic to and from user terminals in the cell of the targeted RBS will be transferred to the temporary RBS,
  the temporary RBS transmitting an identity signal which is the same as that of the RBS whose frequency the temporary RBS transmits on and
  transmitting a list of candidate frequencies, the list being such that user terminals whose traffic has been transferred to the temporary RBS cannot find signals with sufficient strength on any of the candidate frequencies in the vicinity of the cell of the targeted RBS.

2. The method of claim 1, wherein the frequency on which the temporary RBS is programmed to transmit is a frequency used by an RBS which is not immediately adjacent to the cell of the targeted RBS.

3. The method of claim 1, wherein the list of candidate frequencies is empty.

4. The method of claim 1 wherein the telecommunications system is one of a TDMA, CDMA and GSM.

5. The method of claim 1, wherein the identity signal is a Cell Global Identity (CGI) signal or a Basic Station Identity Code (BSIC) signal.

6. A temporary radio base station (RBS) for gaining an maintaining control of the traffic to and from a targeted radio base station in a wireless cellular telecommunications system, wherein said temporary RBS is positioned in or adjacent the targeted RBS, said system comprising a plurality of RBSs for routing traffic to and from user terminals in the system, each RBS controlling the traffic to and from a certain cell within the system, where at least one or a number of said plurality of RBSs in the system each transmits an identity signal and a list of candidate frequencies for use by user terminals when switching RBS, the temporary RBS comprising:

means for transmitting on one of the frequencies in the candidate list broadcasted by the targeted RBS,
means for transmitting at such a power level that traffic to and from users in the cell of the targeted RBS will be transferred to the temporary RBS,
means for transmitting an identity signal which is the same as that of the RBS on whose frequency the temporary RBS transmits on, and
means for sending a list of candidate frequencies, the list being such that user terminals whose traffic has been transferred to the temporary RBS cannot find signals with sufficient strength on any of the candidate frequencies in the vicinity of the cell of the targeted RBS.

7. The temporary RBS of claim 6, in which the list of candidate frequencies can be made empty, wherein the candidate frequencies cannot be found.

8. The temporary RBS of claim 6, being an RBS for use in a TDMA system, a COMA system or a GSM system.

9. The temporary RBS of claim 6, wherein the identity signal is a Cell Global Identity (CGI) signal or a Basic Station Identity Code (BSIC) signal.

10. A dedicated use terminal for use in a wireless cellular telecommunications system comprising a targeted RBS arranged to normally control traffic to and from a first cell within the system for routing traffic to and from the dedicated user terminal, the dedicated user terminal comprising
an identification device with information unique to a temporary radio base station (RBS), wherein the transmissions of the temporary RBS are at such a power level that traffic to and from user terminals in the cell of the targeted RBS are transferred to the temporary RBS and when the temporary RBS has gained and maintained control of the traffic to and from the targeted radio base station,
means for identifying the temporary RBS by use of the unique information being embedded in a transmitted signal from the temporary RBS, the dedicated user terminal being arranged to disregard the temporary RBS when detected, and
means for choosing the targeted RBS, or an RBS arranged to operate in a neighbouring cell, in the same manner as if the temporary RBS does not exist.

11. The dedicated user terminal according to claim 10, wherein the unique information is information that appears normal for a non-dedicated user terminal in the cell, but comprises information that can be identified by the identification device in the dedicated user terminal to be the unique information.

12. The dedicated user terminal according to claim 11, wherein the unique information is a specially adapted list of candidate frequencies that the dedicated user terminal knows in advance so that the identifying means can make a match.

13. The dedicated user terminal according to claim 12, wherein the list of candidate frequencies can be made empty, so that the candidate frequencies cannot be found.

14. The dedicated user terminal according to claim 10, wherein the dedicated user terminal and the temporary RBS are arranged for use in a TDMA system, a CDMA system or a GSM system.

15. The dedicated user terminal according to claim 10, wherein the unique information is comprised in a Cell Global Identity (CGI) signal or a Basic Station Identity Code (BSIC).

16. The dedicated user terminal according to claim 10, wherein the unique information is comprised in a list of candidate frequencies being a Broadcast Control Channel Allocation list (BA-list).

17. The dedicated user terminal according to claim 16, wherein the BA-list is empty or that the BA-list comprises a false candidate, or that the BA-list comprises one or more true candidate frequencies not suitable for use in the cell.

18. A method of using a dedicated user terminal in a wireless cellular telecommunications system, comprising a targeted RBS normally controlling traffic to and from a first cell within the system for routing traffic to and from the dedicated user terminal programming an identification device with information unique for a temporary radio base station (RBS), wherein the transmissions of the temporary RBS are at such a power level that traffic to and from user terminals in the cell of the targeted RBS are transferred to the temporary RBS and having gained and maintained control of the traffic to and from the targeted radio base station,
the identification device identifying the temporary RBS by use of the unique information being at least embedded in a transmitted signal from the temporary RBS
the dedicated user terminal disregarding the temporary RBS when detected, and
choosing the targeted RBS, or an RBS arranged to operate in a neighbouring cell, in the same manner as if the temporary RBS does not exist.

19. The method according to claim 18, wherein the unique information is information that would appear normal for a non-dedicated user terminal in the cell, but comprises information that can be identified by the identification device in the dedicated user terminal to be the unique information.

20. The method according to claim 19, wherein the unique information is a specially adapted list of candidate frequencies that the dedicated user terminal knows in advance so that the identifying means can make a match.

21. The method according to claim 20, wherein the list of candidate frequencies can be made empty, so that the candidate frequencies cannot be found.

* * * * *

UNITED STATES PATENT AND TRADEMARK OFFICE
CERTIFICATE OF CORRECTION

PATENT NO. : 8,478,192 B2  Page 1 of 1
APPLICATION NO. : 12/301694
DATED : July 2, 2013
INVENTOR(S) : Lagerman It is certified that error appears in the above-identified patent and that said Letters Patent is hereby corrected as shown below:

In the Claims

Column 10, Line 60, in Claim 4, delete "claim 1 wherein" and insert -- claim 1, wherein --, therefor.

Column 11, Line 27, in Claim 8, delete "a COMA system" and insert -- a CDMA system --, therefor.

Column 11, Line 31, in Claim 10, delete "dedicated use terminal" and insert -- dedicated user terminal --, therefor.

Signed and Sealed this
Third Day of December, 2013

Margaret A. Focarino
*Commissioner for Patents of the United States Patent and Trademark Office*